US009444653B2

(12) United States Patent
Wang et al.

(10) Patent No.: US 9,444,653 B2
(45) Date of Patent: Sep. 13, 2016

(54) UE, FILTERING METHOD THEREOF AND COMPUTER-READABLE RECORDING MEDIUM

(71) Applicant: Telefonaktiebolaget L M Ericsson (publ), Stockholm (SE)

(72) Inventors: Jianfeng Wang, Beijing (CN); Jinhua Liu, Beijing (CN); Johan Nilsson, Höllviken (SE); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 14/430,238

(22) PCT Filed: Sep. 18, 2013

(86) PCT No.: PCT/CN2013/083747
§ 371 (c)(1),
(2) Date: Mar. 23, 2015

(87) PCT Pub. No.: WO2014/048267
PCT Pub. Date: Apr. 3, 2014

(65) Prior Publication Data
US 2015/0256359 A1    Sep. 10, 2015

(30) Foreign Application Priority Data

Sep. 25, 2012 (WO) ................ PCT/CN2012/081937

(51) Int. Cl.
*H04L 25/02* (2006.01)
*H04J 11/00* (2006.01)
(Continued)

(52) U.S. Cl.
CPC .......... *H04L 25/0202* (2013.01); *H04J 11/005* (2013.01); *H04L 5/0048* (2013.01); *H04L 5/14* (2013.01); *H04L 25/02* (2013.01)

(58) Field of Classification Search
CPC ...................................................... H04L 25/02
See application file for complete search history.

(56) References Cited

U.S. PATENT DOCUMENTS

2010/0118706 A1    5/2010  Parkvall et al.
2011/0149813 A1*   6/2011  Parkvall ............... H04B 7/2656
                                                          370/280
(Continued)

FOREIGN PATENT DOCUMENTS

CN    1761170 A    4/2006
CN    1980090 A    6/2007
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)", Technical Report, 3GPP TR 36.828 V11.0.0, Jun. 1, 2012, pp. 1-109, 3GPP, France.

(Continued)

*Primary Examiner* — John Blanton
(74) *Attorney, Agent, or Firm* — Coats & Bennett, PLLC

(57) ABSTRACT

The invention provides a method filtering in a UE, comprising: estimating a channel and interference for a sub-frame from a cell-specific reference signal received from a serving cell, respectively; determining the sub-frame is a flexible sub-frame, the flexible sub-frame being configured for transmission of different directions for a serving cell and a neighboring cell respectively; and filtering the estimated channel for the flexible sub-frame with a first filtering function having at least one parameter different from that for a normal sub-frame, the normal sub-frame being configured for transmission of same directions for the serving cell and the neighboring cell. The invention also provides a UE using the above method as well as a computer readable recording medium comprising computer instructions for executing the above method.

24 Claims, 3 Drawing Sheets

(51) Int. Cl.
*H04L 5/00* (2006.01)
*H04L 5/14* (2006.01)

(56) References Cited

U.S. PATENT DOCUMENTS

| | | | | |
|---|---|---|---|---|
| 2011/0268050 | A1* | 11/2011 | Farajidana | H04L 25/0226 370/329 |
| 2012/0201152 | A1 | 8/2012 | Yoo et al. | |
| 2014/0233439 | A1* | 8/2014 | Hong | H04W 72/1221 370/280 |
| 2014/0293909 | A1* | 10/2014 | Xu | H04B 7/2656 370/329 |

FOREIGN PATENT DOCUMENTS

| | | |
|---|---|---|
| CN | 101577567 A | 11/2009 |
| CN | 102025411 A | 4/2011 |
| CN | 102598573 A | 7/2012 |
| EP | 1227602 A1 | 7/2002 |
| EP | 2498419 A2 | 9/2012 |
| WO | 2010049587 A1 | 5/2010 |
| WO | 2010063137 A1 | 6/2010 |
| WO | 2014047786 A1 | 4/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 10)", Technical Specification, 3GPP TS 36.211 V10.3.0, Sep. 1, 2011, pp. 1-103, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 9)", Technical Specification, 3GPP TS 36.331 V9.3.0, Jun. 1, 2010, pp. 1-250, 3GPP, France.

Grant, P.M., et al., "Intercell Interference Cancellation for TD-CDMA Mobile Systems", The 11th IEEE International Symposium on Personal, Indoor and Mobile Radio Communications, Sep. 18, 2000, pp. 720-723, IEEE.

Holma, H. et al., "Interference Considerations for the Time Division Duplex Mode of the UMTS Terrestrial Radio Access", IEEE Journal on Selected Areas in Communications, Aug. 1, 2000, pp. 1386-1393, vol. 18, Issue: 8, IEEE.

Karimi, H. R., et al., "Instra-and Inter-Cell Interference Mitigation Algorithms for High-Speed Downlink Packet Access in Ultra-TDD", The Institution of Electrical Engineers, International Conference on 3G Mobile Communication Technologies, Jun. 25, 2003, pp. 369-373, IET.

Spyropoulos, I., et al., "Supporting Asymmetric Traffic in a TDD/CDMA Cellular Network via Interference-Aware Dynamic Channel Allocation and Space—Time LMMSE Joint Detection", IEEE Transactions on Vehicular Technology, Feb. 1, 2009, pp. 744-759, vol. 58, Issue 2, IEEE.

* cited by examiner

UE, FILTERING METHOD THEREOF AND COMPUTER-READABLE RECORDING MEDIUM

TECHNICAL FIELD

The present disclosure relates to interference alleviation in a Time Division Duplex (TDD) communication system, and particularly to a user equipment (UE) and a filtering method in the UE.

BACKGROUND

3GPP Long Term Evolution (LTE) is rapidly emerging as the world's most dominant 4G mobile broadband technology. To further extend the performance and capabilities of LTE radio access technology, 3GPP has been continuously working on the further evolutions of LTE to meet the demands for even higher data rates and network capacity.

LTE can operate in FDD (Frequency Division Duplex) or TDD (Time Division Duplex) mode, and TDD mode offers flexible deployments without requiring a pair of spectrum resources. Currently, LTE TDD allows for asymmetric uplink-downlink allocations by providing seven different semi-statically configured uplink-downlink (UL-DL) configurations. The semi-static allocation may or may not match the instantaneous traffic situation. The mechanisms, in which sub-frames may be allocated for either an uplink (UL) or a downlink (DL) transmission flexibly according to actual requirements, such as the instantaneous traffic situation, which is referred to as dynamic TDD for simplicity hereinafter, has been studied in 3GPP (3GPP TR 36.828 v11.0.0, Evolved Universal Terrestrial Radio Access (E-UTRA); Further enhancements to LTE Time Division Duplex (TDD) for Downlink-Uplink (DL-UL) interference management and traffic adaptation (Release 11), 2012 June). Ministry of Industry and Information Technology (MIIT) of China also shows great interest and identifies it as one of the key features to improve the performance in hot spot and indoor scenario.

In presence of dynamic TDD, when a cell as neighboring one schedules an UL transmission in a flexible sub-frame for a UE (here, the "flexible sub-frame" indicates a sub-frame which may be used for link transmission in a neighboring cell whose direction is different from that in a serving cell, and thus a conflict with the corresponding sub-frame used for the serving cell, i.e., a UL-to-DL interference, may exist, since the flexible sub-frame may be allocated for either a UL or a DL transmission flexibly based on actual requirements), the DL performance of UE(s) in the serving cell close to that UE in the neighboring cell would be seriously degraded, if the UE(s) are scheduled in the same sub-frame due to UE-to-UE interference, which is of great difference from that in a normal DL sub-frame with a fixed frame configuration. Therefore, there exists a problem that there are different UL to DL interference levels in presence of dynamic TDD, which seriously degrades the DL performance.

At the UE side, both a physical channel and the interference may be estimated from cell-specific reference signals which may reflect the interference from neighboring cells using the proprietary algorithms such as interpolation in frequency and time domains based on the classic minimum mean square error (MMSE) criteria, and filtered crossing all DL sub-frames for a legacy UE to assist the demodulation of all common channels, such as PDCCH and PHICH, and PDSCH with transmission modes from 1 to 6. The processing procedure is presented in FIG. 1, where the physical channel and interference are both estimated from cell-specific reference signals for the current, i.e., instantaneous, DL sub-frame. To obtain the more accurate interference estimation without instability, filters in the time domain crossing consecutive DL sub-frames may be always introduced to smooth the estimated value, which may be denoted by the following equations:

$$\bar{H}(n)=(1-\alpha_H)\cdot\bar{H}(n-1)+\alpha_H\cdot H(n), \quad (1)$$

$$\bar{I}(n)=(1-\alpha_I)\cdot\bar{I}(n-1)+\alpha_I\cdot I(n), \quad (2)$$

where $H(n)$ and $\bar{H}(n)$ denote the estimated instantaneous physical channel and the filtered physical channel for the $n^{th}$ DL sub-frame, respectively; $I(n)$ and $\bar{I}(n)$ denote the estimated instantaneous interference power and the filtered estimated interference power for the $n^{th}$ sub-frame, respectively; n denotes a sequential number of the DL sub-frame; and $\alpha_H$ and $\alpha_I$ are forgetting factors for the physical channel and the interference, respectively, which are typically selected as a small number, e.g., 0.05, to guarantee the filtered value as more accurate as possible. The values of $\alpha_H$ and $\alpha_I$ may be designed in consideration of a system performance and variability in the channel which depends on UE velocity.

For the physical channel, the filtering for the estimated physical channel across the sub-frames may better improve the accuracy of a channel analyzer to assist channel estimation, so that the filtering across the sub-frames is always used for the channel estimation. The noisy estimation is expected to be removed by filtering for almost the same physical channel characteristics.

However, the filtering for the estimated interference across the sub-frames is not mandatory, and is only necessary in some cases. For example, if the interference originates from the DL normal sub-frames of the neighboring cells, which includes 1) the sub-frames in all the cells configured to use the same UL-DL sub-frame configuration in a case of high system load and 2) the sub-frames which have the same direction, i.e. DL, in both the serving and neighboring cells, the interference statistic having the same property may be better estimated and filtered according to Equation (2) from the cell-specific reference signals in case of filtering across the sub-frames.

However, with dynamic TDD, the UL-DL sub-frame configurations in the neighboring cells may be different from that in the serving cell. That is, the sub-frames with the same numbers may be configured for the UL transmission and the DL transmission in the neighboring cells, respectively, which thus may be referred to as flexible sub-frames. When the neighboring cell schedules the UL transmission in the flexible sub-frames for its resident UE(s), the DL performance of UE(s) in the serving cell close to that UE in the neighboring cell would be seriously degraded due to the UE-to-UE interference, which is of great difference that in the normal DL sub-frames. For the UE(s) in the serving cell, the characteristics of the experienced UE-to-UE interference in the flexible sub-frames are quite different from the DL to DL (i.e., base station to UE) in the normal DL sub-frames. As a consequence, the interference on the flexible sub-frames may not be filtered from the cell-specific reference signals together with the normal sub-frames with the same filter functions denoted in Equations (1) and (2). The strong interference from the flexible sub-frame may interrupt the correctness of the filtered value, such as to spread the biased interference value to all DL sub-frames, which would degrade the DL performance seriously. That is, when the filters across the sub-frames are deployed in the victim UE(s), the DL performance of all sub-frames are seriously degraded due to that the filtering loops are polluted by the strong UE-to-UE interference.

FIG. 2 as an example shows UL-DL sub-frame configuration 2 and sub-frame configuration 1 for Cell 30-1 and Cell 30-2, respectively, where the configuration number is referred to the 3GPP specification (3GPP TS 36.211 v10.3.0, Evolved Universal Terrestrial Radio Access (E-UTRA); Physical Channels and Modulation (Release 10), 2011 September). The DL sub-frames of Sub-frame #3 and #8 of UE 32-1 served by Cell 30-1 in the cell edge may be seriously interfered by the UL transmission in those Sub-frame #3 and #8 of the UE32-2 served by Cell 30-2, when UE 32-1 and UE 32-2 are close to the cell border between Cell 30-1 and Cell 30-2, as illustrated in FIG. 3. To identify the impact, a small scale field trial with two pico cells and one UE in either cell has been set up. The test results of the UE 32-1 DL throughput on each DL sub-frame in one frame are shown in FIG. 4, which shows that not only Sub-frames #3 and #8 in Cell 30-1 are degraded, but also all normal DL sub-frames are degraded with the existing interference filtering scheme, which is aligned with the theoretical analysis above. Therefore, it is necessary to improve the filtering module for the estimated channel and the estimated interference (if necessary) in the UE.

SUMMARY

Accordingly, a main object of the present disclosure is to provide an effective filtering scheme for interference and channel estimation, so as to alleviate impact of the strong UL to DL interference on the flexible sub-frames by improving DL filtering in presence of dynamic TDD.

In one aspect of the present disclosure, a user equipment UE is provided. The UE comprises an estimation unit configured for estimating a channel and interference for a sub-frame from a cell-specific reference signal, respectively; a determination unit configured for determining the sub-frame is a flexible sub-frame, the flexible sub-frame being configured for transmission of different directions for a serving cell and a neighboring cell respectively; and a filtering unit configured for filtering the estimated channel for the flexible sub-frame with a first filtering function having at least one parameter for the channel different from that for a normal sub-frame, the normal sub-frame being configured for transmission of same directions for the serving cell and the neighboring cell.

Preferably, the filtering unit is further configured for filtering the estimated interference for the flexible sub-frame with a second filtering function having at least one parameter for the interference different from that for the normal sub-frame.

Preferably, the at least one parameter for the channel includes a forgetting factor $\alpha_H$, and the first filtering function satisfies the following equation $$\overline{H}(n)=(1-\alpha_H)\cdot\overline{H}(n-1)+\alpha_H\cdot H(n),$$

wherein $H(n)$ and $\overline{H}(n)$ denote the estimated channel and the filtered estimated channel for the $n^{th}$ DL sub-frame, respectively; n denotes a sequential number of the sub-frame, and $\alpha_H$ is different for the normal sub-frame and the flexible sub-frame.

Preferably, the at least one parameter for the interference includes a forgetting factor $\alpha_I$, and the filtering function satisfies the following equation $$\overline{I}(n)=(1-\alpha_I)\cdot\overline{I}(n-1)+\alpha_I\cdot I(n),$$

wherein $I(n)$ and $\overline{I}(n)$ denote the estimated interference and the filtered estimated interference for a $n^{th}$ sub-frame respectively, n denotes a sequential number of the sub-frame, and $\alpha_I$ is different for the normal sub-frame and the flexible sub-frame.

Preferably, the first filtering function is implemented by a single filter with different parameters for the flexible sub-frame and the normal sub-frame, or is implemented by two filters with different parameters for the flexible sub-frame and the normal sub-frame separately.

Preferably, the second filtering function is implemented by a single filter with different parameters for the flexible sub-frame and the normal sub-frame, or is implemented by two filters with different parameters for the flexible sub-frame and the normal sub-frame separately.

Preferably, the sub-frame is determined to be the flexible sub-frame, if the UE detects any difference in frame configurations based on a TDD configuration signaling received from both the serving cell and the neighboring cell.

Preferably, the sub-frame is determined to be the flexible sub-frame, if a difference between the estimated interference for the sub-frame and the filtered estimated interference for a previous sub-frame is higher than a predefined threshold.

In another aspect of the present disclosure, a filtering method in a user equipment UE is provided. The method comprises: estimating a channel and interference for a sub-frame from a cell-specific reference signal, respectively; determining the sub-frame is a flexible sub-frame, the flexible sub-frame being configured for transmission of different directions for a serving cell and a neighboring cell respectively; and filtering the estimated channel for the flexible sub-frame with a first filtering function having at least one parameter for the channel different from that for a normal sub-frame, the normal sub-frame being configured for transmission of same directions for the serving cell and the neighboring cell.

Preferably, the method further comprises: filtering the estimated interference for the flexible sub-frame with a second filtering function having at least one parameter for the interference different from that for the normal sub-frame.

Preferably, the at least one parameter for the channel includes a forgetting factor $\alpha_H$, and the first filtering function satisfies the following equation $$\overline{H}(n)=(1-\alpha_H)\cdot\overline{H}(n-1)+\alpha_H\cdot H(n),$$

wherein $H(n)$ and $\overline{H}(n)$ denote the estimated channel and the filtered estimated channel for the $n^{th}$ DL sub-frame, respectively; n denotes a sequential number of the sub-frame, and $\alpha_H$ is different for the normal sub-frame and the flexible sub-frame.

Preferably, the at least one parameter for the interference includes a forgetting factor $\alpha_I$, and the filtering function satisfies the following equation $$\overline{I}(n)=(1-\alpha_I)\cdot\overline{I}(n-1)+\alpha_I\cdot I(n),$$

wherein $I(n)$ and $\overline{I}(n)$ denote the estimated interference and the filtered estimated interference for a $n^{th}$ sub-frame respectively, n denotes a sequential number of the sub-frame, and $\alpha_I$ is different for the normal sub-frame and the flexible sub-frame.

Preferably, the first filtering function is implemented by a single filter with different parameters for the flexible sub-frame and the normal sub-frame, or is implemented by two filters with different parameters for the flexible sub-frame and the normal sub-frame separately.

Preferably, the second filtering function is implemented by a single filter with different parameters for the flexible sub-frame and the normal sub-frame, or is implemented by two filters with different parameters for the flexible sub-frame and the normal sub-frame separately.

Preferably, the sub-frame is determined to be the flexible sub-frame, if the UE detects any difference in frame configurations based on a TDD configuration signaling received from both the serving cell and the neighboring cell.

Preferably, the sub-frame is determined to be the flexible sub-frame, if a difference between the estimated interference for the sub-frame and the filtered estimated interference for a previous sub-frame is higher than a predefined threshold.

In another aspect of the present disclosure, a computer readable medium having stored thereon computer executable instructions for a procedure for filtering interference in a user equipment UE is provided. The procedure comprises: estimating a channel and interference for a sub-frame from a cell-specific reference signal, respectively; determining the sub-frame is a flexible sub-frame, the flexible sub-frame being configured for transmission of different directions for a serving cell and a neighboring cell respectively; and filtering the estimated channel for the flexible sub-frame with a first filtering function having at least one parameter for the channel different from that for a normal sub-frame, the normal sub-frame being configured for transmission of same directions for the serving cell and the neighboring cell.

Preferably, the procedure further comprises: filtering the estimated interference for the flexible sub-frame with a second filtering function having at least one parameter for the interference different from that for the normal sub-frame.

Preferably, the at least one parameter for the channel includes a forgetting factor $\alpha_H$, and the first filtering function satisfies the following equation $$\bar{H}(n)=(1-\alpha_H)\cdot\bar{H}(n-1)+\alpha_H\cdot H(n),$$

wherein $H(n)$ and $\bar{H}(n)$ denote the estimated channel and the filtered estimated channel for the $n^{th}$ DL sub-frame, respectively; n denotes a sequential number of the sub-frame, and $\alpha_H$ is different for the normal sub-frame and the flexible sub-frame.

Preferably, the at least one parameter for the interference includes a forgetting factor $\alpha_I$, and the filtering function satisfies the following equation $$\bar{I}(n)=(1-\alpha_I)\cdot\bar{I}(n-1)+\alpha_I\cdot I(n),$$

wherein $I(n)$ and $\bar{I}(n)$ denote the estimated interference and the filtered estimated interference for a $n^{th}$ sub-frame respectively, n denotes a sequential number of the sub-frame, and $\alpha_I$ is different for the normal sub-frame and the flexible sub-frame.

Preferably, the first filtering function is implemented by a single filter with different parameters for the flexible sub-frame and the normal sub-frame, or is implemented by two filters with different parameters for the flexible sub-frame and the normal sub-frame separately.

Preferably, the second filtering function is implemented by a single filter with different parameters for the flexible sub-frame and the normal sub-frame, or is implemented by two filters with different parameters for the flexible sub-frame and the normal sub-frame separately.

Preferably, the sub-frame is determined to be the flexible sub-frame, if the UE detects any difference in frame configurations based on a TDD configuration signaling received from both the serving cell and the neighboring cell.

Preferably, the sub-frame is determined to be the flexible sub-frame, if a difference between the estimated interference for the sub-frame and the filtered estimated interference for a previous sub-frame is higher than a predefined threshold.

The present disclosure may well improve the DL performance of dynamic TDD system with different UL/DL sub-frame configurations in neighboring cells. In particular, the present disclosure introduces multiple filters for either channel or interference with respect to different kinds of DL sub-frames, which are differentiated and grouped according to the characteristics of the experienced interference or extra signaling about the sub-frame configurations from networks, and furthermore a conditional trigger to enable the multiple filters.

BRIEF DESCRIPTION OF THE DRAWINGS

The objects, advantages and characteristics of the present disclosure will be more apparent, according to descriptions of preferred embodiments in connection with the drawings, wherein.

Figure 1:
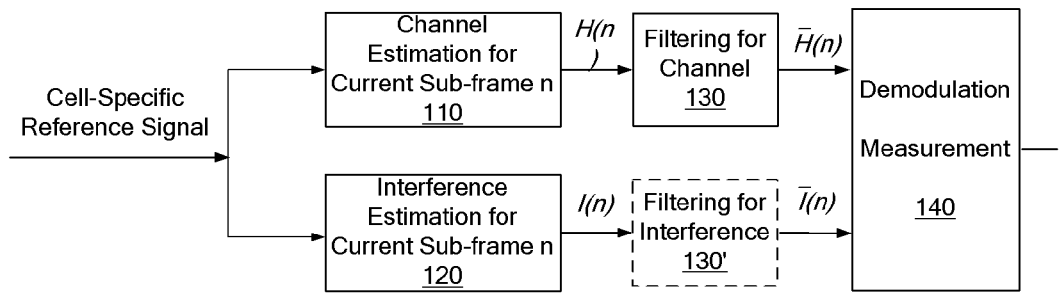
FIG. 1 illustratively shows a schematic block diagram of channel and interference estimation at a UE side.
Figure 2:
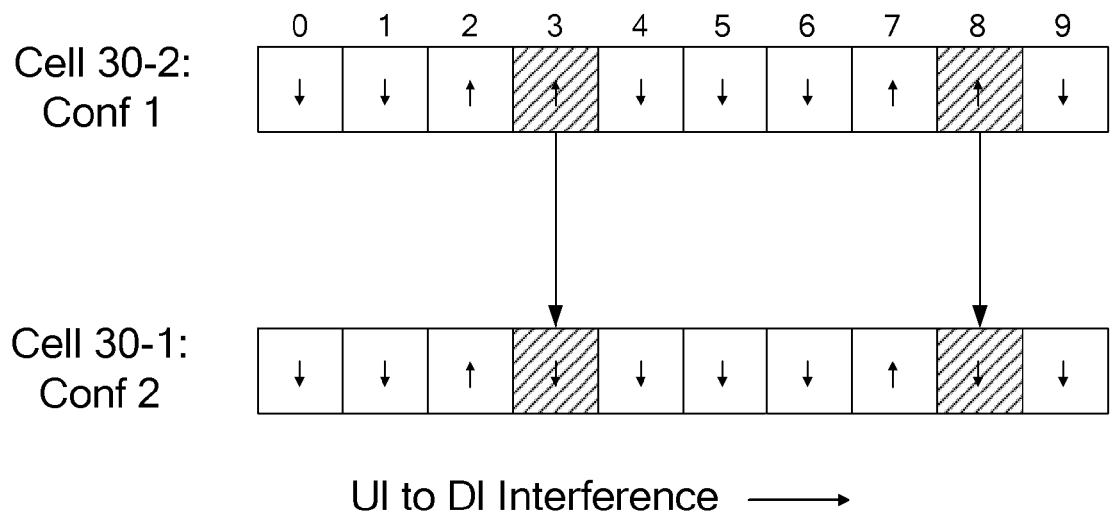
FIG. 2 shows an example of different TDD UL-DL sub-frame configurations used by two neighboring cells.
Figure 3:
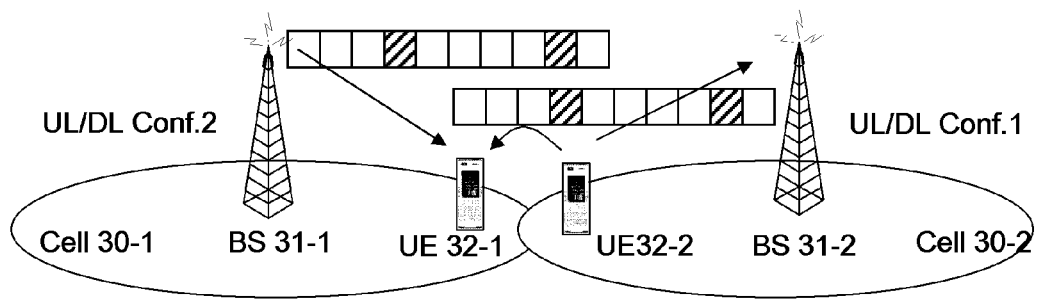
FIG. 3 illustratively shows a system schematic diagram in which two neighboring cells with different TDD UL-DL sub-frame configurations of FIG. 2.
Figure 4:
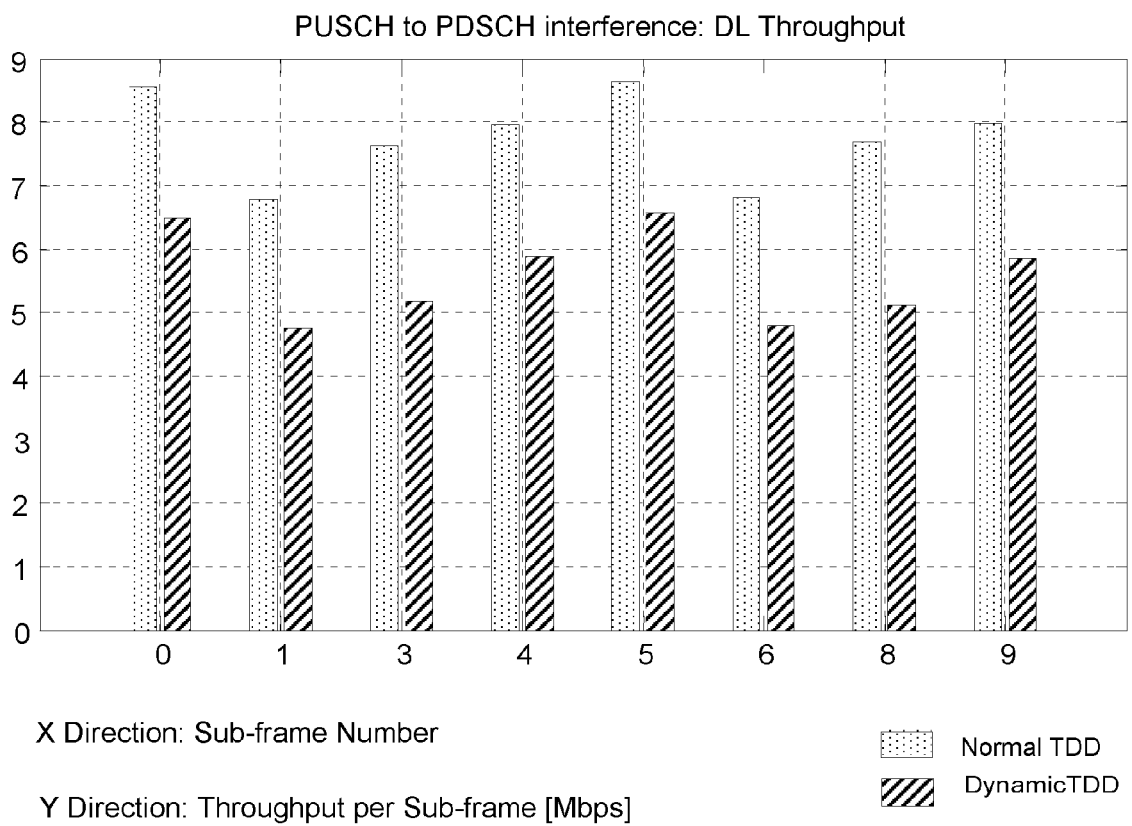
FIG. 4 shows trial results of DL throughput of each sub-frame with dynamic TDD sub-frame configurations of FIG. 2.

It should be noted that various parts in the drawings are not drawn to scale, but only for an illustrative purpose, and thus should not be understood as any limitations and constraints on the scope of the present disclosure.

DETAILED DESCRIPTION

The present disclosure will be further described in detail by referring to the drawings and exemplary embodiments in order to make the objects, technical scheme and advantages of the present disclosure more apparent. In the description, details and functions which are unnecessary to the present disclosure are omitted for clarity. Although the present disclosure is exemplified in the LTE TDD system, the basic idea may also apply for other TDD systems when there is simultaneously transmission in different (DL or UL) directions in neighboring cells of any other wireless communications such as TD-SCDMA.

Figure 5:
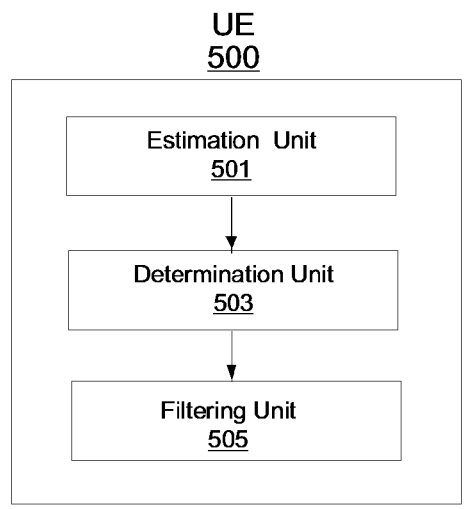
FIG. 5 illustratively shows a block diagram of a UE according to an exemplary embodiment of the present disclosure.

Hereinafter, a structure of a UE according to an exemplary embodiment of the present disclosure will be described in detail with reference to FIG. 5. FIG. 5 illustratively shows a block diagram of the UE 500.

As shown in FIG. 5, the UE 500 may comprise an estimation unit 501 configured for estimating the physical channel and the interference for a sub-frame from a cell-specific reference signal (3GPP TS 36.211 v10.3.0, Evolved Universal Terrestrial Radio Access (E-UTRA); Physical Channels and Modulation (Release 10), 2011 September) received from a serving cell, a determination unit 503 configured for determining whether a current sub-frame is the flexible sub-frame or the normal sub-frame, and a filtering unit 505 configured for filtering the estimated channel and optionally the estimated interference for the current sub-frame.

Because of flexible configurations of the TDD network, there may be two kinds of DL sub-frames for the UE 500, i.e. normal sub-frames and flexible sub-frames, which may have different interference levels and interference sources, i.e., DL to DL and UL to DL. As mentioned previously, the normal sub-frame indicates a sub-frame which may be used for transmission in its own serving cell whose direction is the same as that in a neighboring cell, while the flexible sub-frame indicates a sub-frame which may be used for transmission in its own serving cell whose direction is different from that in a neighboring cell.

The determination unit 503 may be configured for determining whether a sub-frame is the flexible sub-frame or the normal sub-frame. The determination result of the determination unit 503 may be used for a subsequent filtering by the filtering unit 505. For example, the determination unit 503 may be triggered by either signaling from the network or blind detections.

In the case of signaling detection, a TDD UL/DL sub-frame configuration may be broadcasted via System Information Broadcast (SIB) signaling transmission (3GPP TS 36.331 v9.3.0, Evolved Universal Terrestrial Radio Access (E-UTRA); Radio Resource Control (RRC); Protocol specification (Release 9), 2010 June). The determination unit 503 may detect the SIB information for its own serving cell, and also possibly detects the SIB information for the neighboring cell. Once a different configuration is detected, the determination unit 503 may determine that the current sub-frame is a flexible sub-frame; otherwise, the determination unit 503 may determine that the current sub-frame is a normal sub-frame. Then, the determination unit 503 may transmit the determination result to the filtering unit 505.

In the case of blind detection, because the interference of the flexible sub-frame may be much higher than the normal sub-frame if there is strong interference from the UL transmission in the sub-frame from a UE in the neighboring cell, a threshold $I_{thrd}$ may be pre-defined for the determination unit 503 to determine whether the current sub-frame is the flexible sub-frame or the normal sub-frame, based on a comparison between the interference difference level and the predefined threshold. The interference difference level is denoted as the difference between the current and previous sub-frame estimated by the estimation unit 501. In particular, if the estimated interference difference level for the current sub-frame is higher than the predefined threshold, i.e. whether there is any unacceptable high interference from the UL transmission from the neighboring cell, the determination unit 503 may determine that the current sub-frame is the flexible sub-frame and seriously interfered by the neighboring UL sub-frame. Otherwise, the determination unit 503 may determine that the current sub-frame is the normal sub-frame. In a preferred embodiment, the determination may be based on criteria as follows:

If $|I(n)-\bar{I}(n-1)| \geq I_{thrd}$, then

The current sub-frame is determined to be the flexible sub-frame;

else

The current sub frame is determined to be the normal sub frame;

end

Where I(n) denotes the estimated current inference for the $n^{th}$ sub-frame, and $\bar{I}(n-1)$ denotes the filtered interference for the $(n-1)^{th}$ sub-frame, n denotes a sequential number of the DL sub-frame, and $I_{thrd}$ denotes the predefined threshold.

Then, the determination unit 503 may transmit the determination result to the filtering unit 505.

As described above, there may be two kinds of sub-frames for the UE—flexible and normal sub-frames, which could have different interference levels. Therefore, the filtering unit 505 with only one and the same filtering function for channel estimation as shown in Equation (1) and/or only one and the same filtering function for interference estimation as shown in Equation (2) may not be feasible.

Thus, according to an exemplary embodiment of the present disclosure, the filtering unit 505 may be configured for filtering the estimated channel for the flexible sub-frame with a filtering function H(n) having at least one parameter different from that for the normal sub-frame. Preferably, the at least one parameter includes the forgetting factor $\alpha_H$, and the filtering function may satisfy the following equation $$\bar{H}(n) = (1-\alpha_H) \cdot \bar{H}(n-1) + \alpha_H \cdot H(n) \qquad (3)$$

wherein H(n) and $\bar{H}(n)$ denote the estimated channel and the filtered estimated channel for the $n^{th}$ DL sub-frame, respectively; n denotes a sequential number of the sub-frame, and $\alpha_H$ is different for the normal sub-frame and the flexible sub-frame.

Since the channel would have the same geometrics independently of the fact that the sub-frame is a normal sub-frame or a flexible sub-frame, a single filter may be used for implementing the filtering function $\bar{H}(n)$ for both the flexible sub-frames and the normal sub-frames. However, the filter should be adapted accordingly since the estimated value of H(n) is more "noisy" in the flexible sub-frames. For example, the forgetting factor $\alpha_H$ may be set differently by giving higher weight to the channel in the less noisy sub-frames (i.e. the normal sub-frames), represented as $\alpha_{H-NS}$, and less weight to the channel in the noisy sub-frames (i.e. the flexible sub-frames), represented as $\alpha_{H-FS}$, so that the impact from the noisy sub-frames estimation can be decreased in some degree.

Alternatively, two filters may be used, one for implementing the filtering function (called $\bar{H}_{FS}(n)$) for the flexible sub-frames and the other for implementing the filtering function (called $\bar{H}_{NS}(n)$) for the normal sub-frames.

In the present embodiment, if the $n^{th}$ sub-frame is determined by the determination unit 503 to be the normal sub-frame, the filtering unit 505 may use the filtering function $\bar{H}_{NS}(n)$ for filtering the estimated channel of the normal sub-frame n as follows:

$$\bar{H}_{NS}(n) = (1-\alpha_{H-NS}) \cdot \bar{H}_{NS}(n-1) + \alpha_{H-NS} \cdot H_{NS}(n), \qquad (3\text{-}1)$$

If the $k^{th}$ sub-frame is determined by the determination unit 503 to be the flexible sub-frame, the filtering unit 505 may respectively use a filtering function $\bar{H}_{FS}(k)$ for filtering the estimated channel of the flexible sub-frame k as follows:

$$\bar{H}_{FS}(k) = (1-\alpha_{H-FS}) \cdot \bar{H}_{FS}(k-1) + \alpha_{H-FS} \cdot H_{FS}(k), \qquad (3\text{-}2)$$

According to another exemplary embodiment, in a case that high system load and the same UL/DL sub-frame configurations are configured in the serving and neighboring cells, the interference originates from the neighboring DL sub-frames for the victim UE, and it shows the same characteristic. Thus, filtering of the estimated interference for the sub-frame is necessary to acquire more accurate interference power estimation.

In the present embodiment, the filtering unit 505 may be configured for filtering the estimated channel for the flexible sub-frame with a filtering function $\bar{H}(n)$ having at least one parameter different from that for the normal sub-frame, and for further filtering the estimated interference for the flexible sub-frame with a filtering function $\bar{I}(n)$ having at least one parameter different from that for the normal sub-frame.

Preferably, the at least one parameter for the filtering function $\overline{H}(n)$ includes the forgetting factor $\alpha_H$, and the filtering function H(n) may satisfy the following equation $$\overline{H}(n)=(1-\alpha_H)\cdot\overline{H}(n-1)+\alpha_H\cdot H(n) \quad (3)$$

wherein H(n) and $\overline{H}(n)$ denote the estimated channel and the filtered estimated channel for the $n^{th}$ DL sub-frame, respectively; n denotes a sequential number of the sub-frame, and $\alpha_H$ is different for the normal sub-frame and the flexible sub-frame. And the at least one parameter for the filtering function $\overline{I}(n)$ includes a forgetting factor $\alpha_I$, and the filtering function $\overline{I}(n)$ may satisfy the following equation $$\overline{I}(n)=(1-\alpha_I)\cdot\overline{I}(n-1)+\alpha_I\cdot I(n) \quad (4)$$

wherein I(n) and $\overline{I}(n)$ denote the estimated interference and the filtered estimated interference for a $n^{th}$ sub-frame respectively, n denotes a sequential number of the sub-frame, and $\alpha_I$ is different for the normal sub-frame and the flexible sub-frame.

Similarly with previously discussed, a single filter may be used for implementing the filtering function $\overline{H}(n)$ for both the flexible sub-frames and the normal sub-frames, and a single filter may be used for implementing the filtering function $\overline{I}(n)$ for both the flexible sub-frames and the normal sub-frames. The forgetting factor $\alpha_H$ may be set differently by giving higher weight to the channel in the less noisy sub-frames (i.e. the normal sub-frames), represented as $\alpha_{H\text{-}NS}$, and less weight to the channel in the noisy sub-frames (i.e. the flexible sub-frames), represented as $\alpha_{H\text{-}FS}$. And the forgetting factor $\alpha_I$ may be set differently by giving higher weight to the normal sub-frames, represented as $\alpha_{I\text{-}NS}$, and less weight to the channel in the flexible sub-frames, represented as $\alpha_{I\text{-}FS}$, so that the impact of interference estimation from either normal or flexible sub-frame can be decreased.

Alternatively, two filters for channel estimation may be used, one for implementing the filtering function (called $\overline{H}_{FS}(n)$) for the flexible sub-frames and the other for implementing the filtering function (called $\overline{H}_{NS}(n)$) for the normal sub-frames. And two filters for interference estimation may be used, one for implementing the filtering function (called $\overline{I}_{FS}(n)$) for the flexible sub-frames and the other for implementing the filtering function (called $\overline{I}_{NS}(n)$) for the normal sub-frames.

In the present embodiment, if the $n^{th}$ sub-frame is determined by the determination unit 503 to be the normal sub-frame, the filtering unit 505 may respectively use a filtering function $\overline{H}_{NS}(n)$ for filtering the estimated channel of the normal sub-frame n and a filtering function $\overline{I}_{NS}(n)$ for filtering the estimated interference of the normal sub-frame n as follows:

$$\overline{H}_{NS}(n)=(1-\alpha_{H\text{-}NS})\cdot\overline{H}_{NS}(n-1)+\alpha_{H\text{-}NS}\cdot H_{NS}(n), \quad (3\text{-}1)$$

$$\overline{I}_{NS}(n)=(1-\alpha_{I\text{-}NS})\cdot\overline{I}_{NS}(n-1)+\alpha_{I\text{-}NS}\cdot I_{NS}(n), \quad (4\text{-}1)$$

If the $k^{th}$ sub-frame is determined by the determination unit 503 to be the flexible sub-frame, the filtering unit 505 may respectively use a filtering function $\overline{H}_{FS}(k)$ for filtering the estimated channel of the flexible sub-frame k and a filtering function $\overline{I}_{FS}(k)$ for filtering the estimated interference of the flexible sub-frame k as follows:

$$\overline{H}_{FS}(k)=(1-\alpha_{H\text{-}FS})\cdot\overline{H}_{FS}(k-1)+\alpha_{H\text{-}FS}\cdot H_{FS}(k), \quad (3\text{-}2)$$

$$\overline{I}_{FS}(k)=(1-\alpha_{I\text{-}FS})\cdot\overline{I}_{FS}(k-1)+\alpha_{I\text{-}FS}\cdot I_{FS}(k), \quad (4\text{-}2)$$

Then, the UE 500 may utilize the filtering functions to assist to demodulate the DL data in the flexible and normal DL sub-frames, respectively. According to the present disclosure, different filtering functions may be applied for subsequent data demodulation of different type of DL sub-frames.

Figure 6:
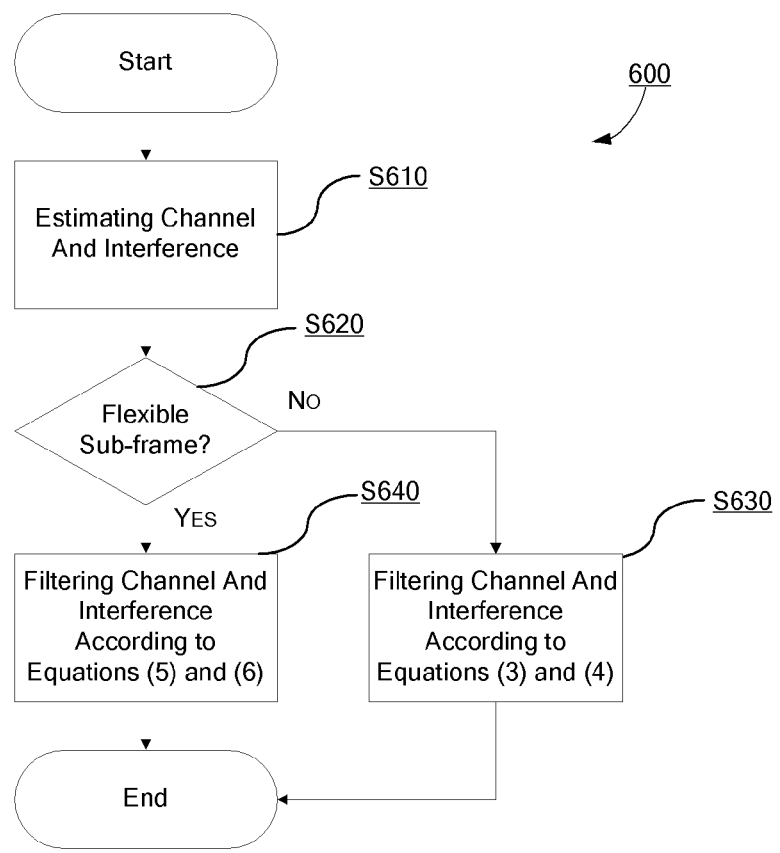
FIG. 6 illustratively shows a flow chart of a filtering method at the UE side according to an exemplary embodiment of the present disclosure.

Hereinafter, a filtering method in the UE 500 may be described with reference to FIG. 6. FIG. 6 illustratively shows a flow chart of the filtering method 600 at the UE 500 side according to the exemplary embodiment of the present disclosure.

In step S610, the estimation unit 501 of the UE 500 may estimate the physical channel and the interference for a sub-frame from a cell-specific reference signal. The cell-specific reference signal may be received from the serving cell which may reflect the interference from neighboring cells.

In step S620, the determination unit 503 of the UE 500 may determining whether a current sub-frame is a flexible sub-frame or a normal sub-frame. The determination result of the determination unit 503 may be used for subsequently filtering by the filtering unit 505. For example, the determination unit 503 may be triggered by either signaling or blindly detections as discussed previously.

For illustration only, without any limitation, a situation in consideration of filtering for both the estimated channel and interference will be described hereinafter. It is easy for the skilled in the art to contemplate the implementation under the situation in which filtering for the estimated interference is not necessary, based on the description as will be described below.

If the current (e.g. $n^{th}$) sub-frame is determined by the determination unit 503 in step S620 to be the normal sub-frame, the process continuous to step S630, the filtering unit 505 may use the filtering function $\overline{H}_{NS}(n)$ for filtering the estimated channel of the flexible sub-frame n and the filtering function $\overline{I}_{NS}(n)$ for filtering the estimated interference of the normal sub-frame n as follows:

$$\overline{H}_{NS}(n)=(1-\alpha_{H\text{-}NS})\cdot\overline{H}_{NS}(n-1)+\alpha_{H\text{-}NS}\cdot H_{NS}(n), \quad (3\text{-}1)$$

$$\overline{I}_{NS}(n)=(1-\alpha_I)\cdot\overline{I}_{NS}(n-1)+\alpha_I\cdot I_{NS}(n), \quad (4\text{-}1)$$

If the current (e.g. $k^{th}$) sub-frame is determined by the determination unit 503 in step S620 to be the flexible sub-frame, the process continuous to step S640, where the filtering unit 505 may use the filtering function $\overline{H}_{FS}(k)$ for filtering the estimated channel of the flexible sub-frame k and the filtering function $\overline{I}_{FS}(k)$ for filtering the estimated interference of the flexible sub-frame k as follows:

$$\overline{H}_{FS}(k)=(1-\alpha_{H\text{-}FS})\cdot\overline{H}_{FS}(k-1)+\alpha_{H\text{-}FS}\cdot H_{FS}(k), \quad (3\text{-}2)$$

$$\overline{I}_{FS}(k)=(1-\alpha_{I\text{-}FS})\cdot\overline{I}_{FS}(k-1)+\alpha_{I\text{-}FS}\cdot I_{FS}(k), \quad (4\text{-}2)$$

where $\alpha_H$ and $\beta_H$ are forgetting factors for the channel estimation on the normal and flexible sub-frames, respectively; and $\alpha_I$ and $\beta_I$ are forgetting factors for interference estimation on the normal and flexible sub-frames, respectively.

Then, the UE 500 may utilize the filtering functions to assist to demodulate the DL data in the flexible and normal DL sub-frames, respectively. According to the present disclosure, different filtering functions may be applied for subsequent data demodulation of different type of DL sub-frames.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The present disclosure may well improve the DL performance of dynamic TDD system with different UL/DL sub-frame configurations in neighboring cells. In particular, the present disclosure introduces multiple interference filters for different kinds of DL sub-frames, which are differentiated and grouped according to the characteristics of the experienced interference, and furthermore a conditional trigger to enable the multiple channel and interference filters.

The above is only the preferred embodiments of the present disclosure and the present disclosure is not limited to the above embodiments. Therefore, any modifications, substitutions and improvements to the present disclosure are possible without departing from the spirit and scope of the present disclosure.

What is claimed is:

1. A user equipment (UE), comprising:
    an estimation circuit configured to:
        estimate a channel for a sub-frame from a cell-specific reference signal;
        estimate interference for the sub-frame from the cell-specific reference signal;
    a determination circuit configured to determine the sub-frame is a flexible sub-frame, the flexible sub-frame being configured for transmission of different directions for a serving cell and a neighboring cell respectively;
    a filtering circuit configured to filter the estimated channel for the flexible sub-frame with a first filtering function having at least one parameter for the channel different from that for a normal sub-frame, the normal sub-frame being configured for transmission of same directions for the serving cell and the neighboring cell.

2. The UE of claim 1, wherein the at least one parameter for the channel includes a forgetting factor $\alpha_H$, and the first filtering function satisfies the following equation $$\overline{H}(n)=(1-\alpha_H)\cdot\overline{H}(n-1)+\alpha_H\cdot H(n),$$

wherein $H(n)$ and $\overline{H}(n)$ denote the estimated channel and the filtered estimated channel for the $n^{th}$ DL sub-frame, respectively; n denotes a sequential number of the sub-frame; and $\alpha_H$ is different for the normal sub-frame and the flexible sub-frame.

3. The UE of claim 1, wherein the first filtering function is implemented by a single filter with different parameters for the flexible sub-frame and the normal sub-frame, or is implemented by two filters with different parameters for the flexible sub-frame and the normal sub-frame separately.

4. The UE of claim 1, wherein the sub-frame is determined to be the flexible sub-frame if the UE detects any difference in frame configurations based on a Time Division Duplex configuration signaling received from both the serving cell and the neighboring cell.

5. The UE of claim 1, wherein the filtering circuit is further configured to filter the estimated interference for the flexible sub-frame with a second filtering function having at least one parameter for the interference different from that for the normal sub-frame.

6. The UE of claim 5, wherein the at least one parameter for the interference includes a forgetting factor $\alpha_I$, and the filtering function satisfies the following equation $$\overline{I}(n)=(1-\alpha_I)\cdot\overline{I}(n-1)+\alpha_I\cdot I(n),$$

wherein $I(n)$ and $\overline{I}(n)$ denote the estimated interference and the filtered estimated interference for a $n^{th}$ sub-frame, respectively; n denotes a sequential number of the sub-frame; and $\alpha_I$ is different for the normal sub-frame and the flexible sub-frame.

7. The UE of claim 5, wherein the second filtering function is implemented by a single filter with different parameters for the flexible sub-frame and the normal sub-frame, or is implemented by two filters with different parameters for the flexible sub-frame and the normal sub-frame separately.

8. The UE of claim 5, wherein the sub-frame is determined to be the flexible sub-frame if a difference between the estimated interference for the sub-frame and the filtered estimated interference for a previous sub-frame is higher than a predefined threshold.

9. A filtering method in a user equipment (UE), the method comprising:
    estimating a channel for a sub-frame from a cell-specific reference signal;
    estimating interference for the sub-frame from the cell-specific reference signal;
    determining the sub-frame is a flexible sub-frame, the flexible sub-frame being configured for transmission of different directions for a serving cell and a neighboring cell respectively;
    filtering the estimated channel for the flexible sub-frame with a first filtering function having at least one parameter for the channel different from that for a normal sub-frame, the normal sub-frame being configured for transmission of same directions for the serving cell and the neighboring cell.

10. The method of claim 9, wherein the at least one parameter for the channel includes a forgetting factor $\alpha_H$, and the first filtering function satisfies the following equation $$\overline{H}(n)=(1-\alpha_H)\cdot\overline{H}(n-1)+\alpha_H\cdot H(n),$$

wherein $H(n)$ and $\overline{H}(n)$ denote the estimated channel and the filtered estimated channel for the $n^{th}$ DL sub-frame, respectively; n denotes a sequential number of the sub-frame; and $\alpha_H$ is different for the normal sub-frame and the flexible sub-frame.

11. The method of claim 9, wherein the first filtering function is implemented by a single filter with different parameters for the flexible sub-frame and the normal sub-frame, or is implemented by two filters with different parameters for the flexible sub-frame and the normal sub-frame separately.

12. The method of claim 9, wherein the sub-frame is determined to be the flexible sub-frame if the UE detects any difference in frame configurations based on a Time Division Duplex configuration signaling received from both the serving cell and the neighboring cell.

13. The method of claim 9, further comprising filtering the estimated interference for the flexible sub-frame with a second filtering function having at least one parameter for the interference different from that for the normal sub-frame.

14. The method of claim 13, wherein the at least one parameter for the interference includes a forgetting factor $\alpha_I$, and the filtering function satisfies the following equation $$\bar{I}(n)=(1-\alpha_I)\cdot\bar{I}(n-1)+\alpha_I\cdot I(n),$$

wherein I(n) and $\bar{I}(n)$ denote the estimated interference and the filtered estimated interference for a $n^{th}$ sub-frame, respectively; n denotes a sequential number of the sub-frame; and $\alpha_I$ is different for the normal sub-frame and the flexible sub-frame.

15. The method of claim 13, wherein the second filtering function is implemented by a single filter with different parameters for the flexible sub-frame and the normal sub-frame, or is implemented by two filters with different parameters for the flexible sub-frame and the normal sub-frame separately.

16. The method of claim 13, wherein the sub-frame is determined to be the flexible sub-frame if a difference between the estimated interference for the sub-frame and the filtered estimated interference for a previous sub-frame is higher than a predefined threshold.

17. A computer program product stored in a non-transitory computer program product for controlling a procedure for filtering interference in a user equipment (UE), the computer program product comprising software instructions which, when run on one or more processing circuits of the UE, causes the UE to perform a procedure comprising:
    estimating a channel for a sub-frame from a cell-specific reference signal;
    estimating interference for the sub-frame from the cell-specific reference signal;
    determining the sub-frame is a flexible sub-frame, the flexible sub-frame being configured for transmission of different directions for a serving cell and a neighboring cell respectively;
    filtering the estimated channel for the flexible sub-frame with a first filtering function having at least one parameter for the channel different from that for a normal sub-frame, the normal sub-frame being configured for transmission of same directions for the serving cell and the neighboring cell.

18. The computer program product of claim 17, wherein the at least one parameter for the channel includes a forgetting factor $\alpha_H$, and the first filtering function satisfies the following equation $$\bar{H}(n)=(1-\alpha_H)\cdot\bar{H}(n-1)+\alpha_H\cdot H(n),$$

wherein H(n) and $\bar{H}(n)$ denote the estimated channel and the filtered estimated channel for the $n^{th}$ DL sub-frame, respectively; n denotes a sequential number of the sub-frame; and $\alpha_H$ is different for the normal sub-frame and the flexible sub-frame.

19. The computer program product of claim 17, wherein the first filtering function is implemented by a single filter with different parameters for the flexible sub-frame and the normal sub-frame, or is implemented by two filters with different parameters for the flexible sub-frame and the normal sub-frame separately.

20. The computer program product of claim 17, wherein the sub-frame is determined to be the flexible sub-frame if the UE detects any difference in frame configurations based on a Time Division Duplex configuration signaling received from both the serving cell and the neighboring cell.

21. The computer program product of claim 17, wherein the procedure further comprises filtering the estimated interference for the flexible sub-frame with a second filtering function having at least one parameter for the interference different from that for the normal sub-frame.

22. The computer program product of claim 21, wherein the at least one parameter for the interference includes a forgetting factor $\alpha_I$, and the filtering function satisfies the following equation $$\bar{I}(n)=(1-\alpha_I)\cdot\bar{I}(n-1)+\alpha_I\cdot I(n),$$

wherein I(n) and $\bar{I}(n)$ denote the estimated interference and the filtered estimated interference for a $n^{th}$ sub-frame, respectively; n denotes a sequential number of the sub-frame; and $\alpha_I$ is different for the normal sub-frame and the flexible sub-frame.

23. The computer program product of claim 21, wherein the second filtering function is implemented by a single filter with different parameters for the flexible sub-frame and the normal sub-frame, or is implemented by two filters with different parameters for the flexible sub-frame and the normal sub-frame separately.

24. The computer program product of claim 21, wherein the sub-frame is determined to be the flexible sub-frame if a difference between the estimated interference for the sub-frame and the filtered estimated interference for a previous sub-frame is higher than a predefined threshold.

* * * * *